(12) United States Patent
Abdellah et al.

(10) Patent No.: US 12,523,554 B2
(45) Date of Patent: Jan. 13, 2026

(54) RESISTIVE AND CAPACITIVE FORCE SENSOR AND METHOD OF OPERATING THE SAME

(71) Applicant: Tacterion GmbH, Munich (DE)

(72) Inventors: Alaa Abdellah, Munich (DE); Michael Wolfgang Strohmayr, Augsburg (DE); Marco Sgueglia, Munich (DE)

(73) Assignee: TACTERION GMBH, Munich (DE)

( * ) Notice: Subject to any disclaimer, the term of this patent is extended or adjusted under 35 U.S.C. 154(b) by 540 days.

(21) Appl. No.: 18/078,147

(22) Filed: Dec. 9, 2022

(65) Prior Publication Data

US 2023/0194364 A1    Jun. 22, 2023

(30) Foreign Application Priority Data

Dec. 9, 2021   (DE) .................... 10 2021 132 509.9

(51) Int. Cl.
  *G01L 1/14*   (2006.01)
  *G01L 1/22*   (2006.01)
  *G01L 25/00*  (2006.01)
(52) U.S. Cl.
  CPC .............. *G01L 1/144* (2013.01); *G01L 1/225* (2013.01); *G01L 25/00* (2013.01)
(58) Field of Classification Search
  CPC .............. G01L 1/14; G01L 1/142; G01L 1/18
  See application file for complete search history.

(56) References Cited

U.S. PATENT DOCUMENTS

| | | | |
|---|---|---|---|
| 9,364,203 B2 * | 6/2016 | Strohmayr | A61B 34/70 |
| 2014/0090488 A1 | 4/2014 | Taylor et al. | |
| 2017/0261388 A1 | 9/2017 | Ma et al. | |
| 2019/0011316 A1 | 1/2019 | Klemm | |
| 2021/0181049 A1 | 6/2021 | Kwak et al. | |
| 2022/0407517 A1 | 12/2022 | Roziere et al. | |

FOREIGN PATENT DOCUMENTS

| | | |
|---|---|---|
| DE | 102015111425 A1 | 1/2016 |
| FR | 3103334 A1 | 5/2021 |

\* cited by examiner

*Primary Examiner* — Erika J. Villaluna
(74) *Attorney, Agent, or Firm* — Hoffmann & Baron, LLP (57) ABSTRACT

Resistive and capacitive force sensor including an element having first and second electrodes, wherein the element is configured such that, when an external force is applied, intrinsic capacitance of the electrodes and intrinsic resistance between the electrodes change as a function of a magnitude of the external force; a first unit connected to the electrodes and configured to determine an intrinsic electrical capacitance C(t) of the second electrode; a second unit connected to the electrodes and configured to determine an electrical resistance R(t) between the electrodes; an evaluation unit configured to determine magnitude |F(t)| of force F(t) applied externally to the element as a function of a mean value of the determined intrinsic capacitance C(t) in a time interval and as a function of a mean value of the determined resistance R(t) in the time interval; and an output unit configured to output the determined magnitude |F(t)| of force F(t).

18 Claims, 5 Drawing Sheets

RESISTIVE AND CAPACITIVE FORCE SENSOR AND METHOD OF OPERATING THE SAME

CROSS-REFERENCE TO RELATED APPLICATIONS

This application claims benefit of German Patent Application No. 10 2021 132 509.9, filed on 9 Dec. 2021, the contents of which are incorporated herein by reference in their entirety.

BACKGROUND

Field

The invention relates to a resistive and capacitive force sensor and a method of operating the same. A "resistive and capacitive force sensor" is understood to mean, in particular, a force sensor that is designed and configured to simultaneously detect a change in an electrical resistance and an electrical capacitance. In particular, this is understood to mean a single sensor that is designed and configured to simultaneously detect a change in an electrical resistance and an electrical capacitance, i.e., not a combination of a resistive force sensor and a further capacitive force sensor.

SUMMARY

The object of the invention is to specify a resistive and capacitive force sensor—i.e., a hybrid force sensor—as well as a method of operating the same, wherein the force sensor, in particular, has a low measured value drift and thus enables a more accurate, more stable, and thus improved detection of an external force acting on the sensor.

The basic design of resistive and capacitive force sensors is assumed. For this, reference is made to the known prior art.

The invention results from the features of the independent claims. Advantageous further developments and embodiments are the subject of the dependent claims. Further features, application possibilities, and advantages of the invention result from the following description, as well as from the explanation of embodiments of the invention, which are shown in the figures.

The invention is based on the knowledge that both capacitive force sensors and resistive force sensors exhibit a drift of the measured values when a constant external force is applied to the force sensor over a measuring period of, for example, 1 min to 500 min. The drift behavior of capacitive and resistive force sensors is different.

Evaluations of measurement series with hybrid force sensors, i.e., on resistive and capacitive force sensors with at least a first electrode E1 and a second electrode E2 and simultaneous detection of resistance and capacitance changes at the electrodes E1 and E2, have shown that this measured value drift can be considerably reduced by offsetting resistance measured values and capacitance measured values.

It is noted that throughout this document it is assumed that "external forces acting on the sensor element/force sensor" refers to mechanical forces acting on the force sensor/sensor element via direct mechanical contact. Other forces, in particular, gravitational forces, electrical forces, magnetic forces, etc., are therefore not meant here.

The above object is solved with a resistive and capacitive force sensor which has at least one sensor element with at least a first electrode E1 and a second electrode E2, wherein the sensor element is designed in such a way that, when an external force F is applied, the inherent electrical capacitance C of the electrodes E1 and/or E2 and the electrical resistance R between the first electrode E1 and the second electrode E2 change as a function of the force F, i.e., as a function of a magnitude |F| of the force F.

Further, the proposed force sensor includes a first measuring unit electrically connected to the first electrode E1 and the second electrode E2, and configured and arranged to determine a time-dependent intrinsic electrical capacitance $C(t)$ of the electrode E2, and a second measuring unit electrically connected to the first electrode E1 and the second electrode E2, and configured and arranged to determine a time-dependent electrical resistance $R(t)$ between the first electrode E1 and the second electrode E2.

Furthermore, the proposed force sensor has an evaluation unit designed and set up to determine a magnitude $|F(t)|$ of a force $F(t)$ applied externally to the sensor element as a function of a mean value $\mathrm{mean}(C[t-\Delta t, t])$ of the determined time-dependent intrinsic capacitance $C(t)$ in a time interval $[t-\Delta t, t]$ and dependent on a mean value $\mathrm{mean}(R[t-\Delta t, t])$ of the determined time-dependent resistance $R(t)$ in the time interval $[t-\Delta t, t]$:

$$|F(t)|=|F(\mathrm{mean}(C[t-\Delta t,t]),\mathrm{mean}(R[t-\Delta t,t]))| \qquad (1)$$

with $\Delta t$: time period and $t$: time.

Finally, the proposed force sensor has an output unit for outputting and/or displaying the determined force magnitude $|F(t)|$ of the external force $F(t)$.

In an advantageous further development, the force magnitude $|F(t)|$ of the external force $F(t)$ is determined by the evaluation unit as follows:

$$|F(t)|=C_{OFFSET}-(\mathrm{mean}(C[t-\Delta t,t])-m\cdot\mathrm{mean}(R[t-\Delta t,t])) \qquad (2)$$

with:
$C_{OFFSET}$: first calibration constant,
$\mathrm{mean}(C[t-\Delta t, t])$: mean value of the time-dependent intrinsic capacitance $C(t)$ in the time interval $[t-\Delta t, t]$,
$\mathrm{mean}(R[t-\Delta t, t])$: mean value of the time-dependent resistance $R(t)$ in the time interval $[t-\Delta t, t]$, and
$m$: second calibration constant.

Thus, the force magnitude $|F(t)|$ of the external force $F(t)$ is advantageously determined based on a linear relationship of $R(t)$ or $\mathrm{mean}(R[t-\Delta t, t])$ and $C(t)$ or $\mathrm{mean}(C[t-\Delta t, t])$.

In one embodiment, the mean values: $\mathrm{mean}(C[t-\Delta t, t])$ and $\mathrm{mean}(R[t-\Delta t, t])$ are determined by the evaluation unit as arithmetic mean values, respectively. Of course, other calculation methods (statistical mean, geometric mean, harmonic mean, weighted mean, etc.) can be used to determine the "mean values".

Of course, the idea of the invention also includes approximation methods of higher degree for the force magnitude $|F(t)|$. However, the essential finding is that the linear relationship assumed above ($1^{st}$ order approximation) is already sufficiently exact for many applications to compensate for the measured value drift and to obtain considerably more exact measurement results for external force $F(t)$. Furthermore, real-time applications are possible due to a low computational effort especially for a linear approximation.

Higher degree (e.g., $2^{nd}$ order, $3^{rd}$ order, etc.) approximations for $R(t)$ and/or $C(t)$ or for the relation between $F(t)$ and $R(t)$ and $C(t)$ can be added as further terms to the linear approach according to equation (2), analogous to a Taylor series expansion. It is mathematically equivalent to add higher degree approximation terms to equation (2) or to explicitly state an analytical equation for the respective higher degree approximation.

To determine the intrinsic electrical capacitance C(t) of electrode E2, the first measuring unit advantageously uses a charge transfer acquisition method as described, for example, in the document: "STM32L4-TSC, Touch Sensing Controller", ST life.augmented, Revision 3.2.; https://www.st.com/content/ccc/resource/training/technical/product_training/6b/ea/47/06/18/83/43/67/STM32L4_Peripheral_Touchsense.pdf/files/STM32L4_Peripheral_Touchsense.pdf/jcr: content/translations/en.STM32L4_Peripheral_Touchsense.pdf.

In an advantageous embodiment, the at least one sensor element is a piezoresistive force sensor.

In an advantageous embodiment, the sensor element has: a substrate layer made of an electrically non-conductive material M1, a first electrode layer ES1 applied to an upper side of the substrate layer as a first electrode E1, and a second electrode layer ES2 applied to the upper side of the substrate layer as an electrode E2. The first electrode E1 and the second electrode E2 are each formed in a and are arranged on the upper surface of the substrate layer in such a way that they engage with each other in a comb-like manner without making electrical contact with each other. Above the top surface with the electrode layers applied to it, there is a further electrically conductive elastic layer ES0 spaced from the electrodes in the unloaded state (i.e., when no external force is applied). When an external force is applied to the sensor element, this layer ES0 is bent in the direction of the electrode layers and leads to contact between the electrode layers ES1 and ES2 through ES0 and thus to electrical contact between ES1 and ES2.

In another advantageous embodiment, the sensor element includes: a substrate layer made of an electrically non-conductive material M1, a first electrode layer ES1 applied to an upper side of the substrate layer as a first electrode E1, and a second electrode layer ES2 applied to the upper side of the substrate layer as an electrode E2, wherein the first and second electrode layers ES1, ES2 are made of an electrically conductive material M2, are arranged on the upper side laterally spaced apart from one another and each have a 2D shape which is designed in such a way, in that partial regions of the electrode layer ES1 and partial regions of the electrode layer ES2 alternate successively several times at least in a region B on the top side along a direction R0, a spacer layer of an essentially electrically non-conductive material M3 including first spacers applied to the substrate layer in interstices between the electrode layers ES1 and ES2 and projecting beyond the latter in the rest state and/or including second spacers applied individually in each case to the electrode layers ES1 and ES2, and a measuring layer of an electrically conductive, elastic and stretchable material M4 applied to the spacer layer.

In another advantageous embodiment, the sensor element includes: a substrate layer made of an electrically non-conductive material M1, a first electrode layer ES1 applied to an upper side of the substrate layer as a first electrode E1, and a second electrode layer ES2 applied to the upper side of the substrate layer as an electrode E2, wherein the first and second electrode layers ES1, ES2 are made of an electrically conductive material M2, are arranged on the upper side laterally spaced apart from one another and each have a 2D shape which is designed in such a way that partial regions of the electrode layer ES1 and partial regions of the electrode layer ES2 alternate several times in succession along a direction R0 at least in a region B on the upper side, a spacer layer applied to the substrate layer with the electrode layers ES1 and ES2 applied thereto, the spacer layer consisting, at least in the region B, of individual strands ST of an essentially electrically non-conductive material M3 running in a direction R1 and spaced apart from one another in each case, wherein the direction R1 and the direction R0 enclose an angle $\alpha$ from an angular range [30°-60°], or the spacer layer consists, at least in the region B, of a perforated grid of an essentially electrically non-conductive material M3 with grid axes G1, G2 running parallel to the upper side, wherein the direction R0 and one of the grid axes G1, G2 enclose an angle $\alpha$ from the angular range [30°-60°], and a measuring layer applied to the spacer layer and consisting of an electrically conductive, elastic and stretchable material M4.

In an advantageous further development of the proposed resistive and capacitive force sensor, a calibration unit is additionally provided which is designed and set up to determine the first calibration constant $C_{OFFSET}$ by detecting the intrinsic capacitance of the second electrode E2 over a first calibration period $\Delta t_{CAL1}$ and subsequent averaging. During this calibration period $\Delta t_{CAL1}$ no force is applied to the sensor element. The first calibration period $\Delta t_{CAL1}$ is advantageously selected from the interval 1 min to 60 min and is, in particular, 5 min, 10 min, 20 min, 30 min, or 45 min.

In an advantageous further development of the proposed resistive and capacitive force sensor, the calibration unit is designed and arranged to determine the second calibration constant m by calibration, wherein for a second calibration period $\Delta t_{CAL2}$ a constant force $F_0$ of magnitude $|F_0|>0$ is applied to the sensor element for a second calibration period $\Delta t_{CAL2}$, the intrinsic electrical capacitance C(t) of the second electrode E2 and the electrical resistance R(t) between the first electrode E1 and a second electrode E2 are recorded, and the second calibration constant m is then determined from the recorded values for C(t) and R(t) by linear regression or known mathematical methods alternative thereto. The second calibration period $\Delta t_{CAL2}$ is advantageously selected from the interval 1 min to 180 min and is, in particular, 5 min, 10 min, 20 min, 30 min, 45 min, 60 min, 100 min, 120 min, or 150 min.

In an advantageous further development of the proposed resistive and capacitive force sensor, the calibration unit has a mechanical device for applying the constant force $F_0$ of a magnitude $|F_0|>0$ to the sensor element. Advantageously, this mechanical device has at least one actuator that can be controlled by the calibration unit. The device is advantageously designed in such a way that it can be (actively) positioned during the time when no calibration is being performed in such a way that it does not impair the function of the force sensor.

In an advantageous further development of the proposed resistive and capacitive force sensor, the calibration unit is designed and arranged so that the determination of the first calibration constant $C_{OFFSET}$ is only carried out if the electrical resistance R(t) between the first electrode E1 and the second electrode E2 is constant, essentially infinite, throughout the first calibration period $\Delta t_{CAL1}$ (i.e., there is no electrical contact between the first electrode E1 and the second electrode E2 during calibration). This ensures that the determination of the first calibration constant $C_{OFFSET}$ is only performed when no or only a negligible external force is applied to the sensor element.

In an advantageous further development of the proposed resistive and capacitive force sensor, a third electrode E3 is provided on the sensor element for capacitive distance measurement between an object and the sensor element. The third electrode E3 can at least partially enclose the electrodes E1 and E2. In this further embodiment, the evaluation unit is designed and set up to perform the determination of the first calibration constant $C_{OFFSET}$ only if the capacitance of the third electrode E3 is smaller than a predetermined limit value, wherein the limit value represents a capacitance and thus a distance at which the object has no mechanical contact with the sensor element. This ensures that the determination of the first calibration constant $C_{OFFSET}$ is only performed when an object does not approach the sensor element closer than the capacitance limit value and thus no external force acts on the sensor element.

The proposed resistive and capacitive force sensor has an effective and stable drift compensation with a very small drift error for static force inputs. This enables higher measurement accuracy and allows the definition of very narrow force bands in the measurement range of the resistive and capacitive force sensor.

Another aspect of the invention relates to a method of operating a resistive and capacitive force sensor, as described above, including at least one sensor element having at least a first electrode E1 and a second electrode E2, wherein the sensor element is configured such that when an external force F is applied, the intrinsic electrical capacitance C of the electrodes E1 and/or E2 and the electrical resistance R between the first electrode E1 and a second electrode E2 change depending on the magnitude |F| of the force F. The proposed method includes following steps.

In a first step, a first measuring unit electrically connected to the first electrode E1 and the second electrode E2 is used to determine the intrinsic electrical capacitance C(t) of electrode E2.

In a second step, a second measuring unit electrically connected to the first electrode E1 and the second electrode E2 is used to determine the electrical resistance R(t) between the first electrode E1 and the second electrode E2.

In a third step, an evaluation unit is used to determine a force magnitude |F(t)| of a force F(t) applied externally to the sensor element as a function of a mean value mean(C[t−Δt, t]) of the determined time-dependent intrinsic capacitance C(t) in a time interval [t−Δt, t] and as a function of a mean value mean(R[t−Δt, t]) of the determined time-dependent resistance R(t) in the time interval [t−Δt, t]:

$$|F(t)|=|F(\text{mean}(C[t-\Delta t,t]),\text{mean}(R[t-\Delta t,t]))| \quad (1)$$

with Δt: time period and t: time.

In a fourth step, the determined force magnitude |F(t)| is output and/or displayed.

An advantageous further development of the proposed method is also characterized by the fact that the evaluation unit determines the force magnitude |F(t)| of the external force F(t) as follows:

$$|F(t)|=C_{OFFSET}-(\text{means}(C[t-\Delta t,t])-m\cdot\text{mean}(R[t-\Delta t,t])) \quad (2)$$

with:
$C_{OFFSET}$: first calibration constant,
mean(C[t−Δt, t]): mean value of the time-dependent intrinsic capacitance C(t) in the time interval [t−Δt, t],
mean(R[t−Δt, t]): mean value of the time-dependent resistance R(t) in the time interval [t−Δt, t], and
m: second calibration constant.

An advantageous further development of the proposed method is also characterized by the fact that the evaluation unit determines the mean values: mean(C[t−Δt, t]) and mean(R[t−Δt, t]) as arithmetic mean values, respectively.

An advantageous further development of the proposed method is also characterized by the fact that the first measuring unit uses a charge transfer acquisition method to determine the intrinsic electrical capacitance C(t) of electrode E2.

An advantageous further development of the proposed method is also characterized in that the sensor element additionally has a calibration unit, wherein the calibration unit determines the first calibration constant $C_{OFFSET}$ by detecting the intrinsic capacitance C(t) of the second electrode E2 without external application of force to the sensor element over a first calibration period $\Delta t_{CAL1}$ and subsequent averaging.

An advantageous further development of the proposed method is characterized in that the calibration unit determines the second calibration constant m by calibration, wherein for a second calibration period $\Delta t_{CAL2}$ a constant force $F_0$ of a magnitude $|F_0|>0$ is applied to the sensor element for a second calibration period $\Delta t_{CAL2}$, the intrinsic electrical capacitance C(t) of the second electrode E2 and the electrical resistance R(t) between the first electrode E1 and a second electrode E2 are recorded, and the second calibration constant m is then determined from the recorded values for C(t) and R(t) by linear regression or an equivalent mathematical method.

An advantageous further development of the proposed method is characterized in that the calibration unit is designed and arranged to perform the determination of the first calibration constant $C_{OFFSET}$ only if the electrical resistance R(t) between the first electrode E1 and the second electrode E2 is constantly substantially infinite throughout the first calibration period $\Delta t_{CAL1}$.

An advantageous further development of the proposed method is characterized in that a third electrode E3 is present on the sensor element for capacitive distance measurement between an object and the sensor element, and the evaluation unit carries out the determination of the first calibration constant $C_{OFFSET}$ only if the capacitance of the third electrode E3 is smaller than a predetermined limit value, wherein the limit value represents a capacitance at which the object has no mechanical contact with the sensor element.

An advantageous further development of the proposed method is that $C_{OFFSET}$ and/or m are determined automatically when the resistive and capacitive force sensors are put into operation.

Advantages and further developments of the proposed method result from analogous and similar transfer of the foregoing statements made in connection with the proposed force sensor.

Further advantages, features, and details result from the following description, in which—possibly with reference to the drawings—at least one example embodiment is described in detail. Identical, similar, and/or functionally identical parts are provided with the same reference numbers.

DETAILED DESCRIPTION

Figure 1:
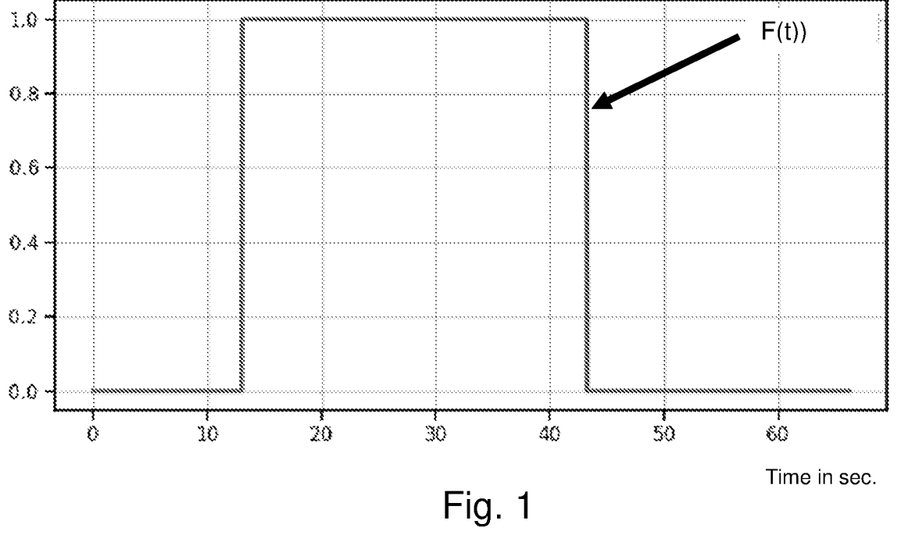
FIG. 1 shows a force-time diagram to show the time course of a force F(t) applied externally to a force sensor.

FIG. 1 shows a force-time diagram to illustrate the time course of a force F(t) applied externally to a force sensor. The time t in seconds is shown along the x-axis and a normalized unit of force is shown along the y-axis. The force is applied starting at second 13 and ending at second 43. In this time interval, the mechanical force F(t)=1.0 (in normalized units) is applied externally to the force sensor, such as the one described here.

Figure 2:
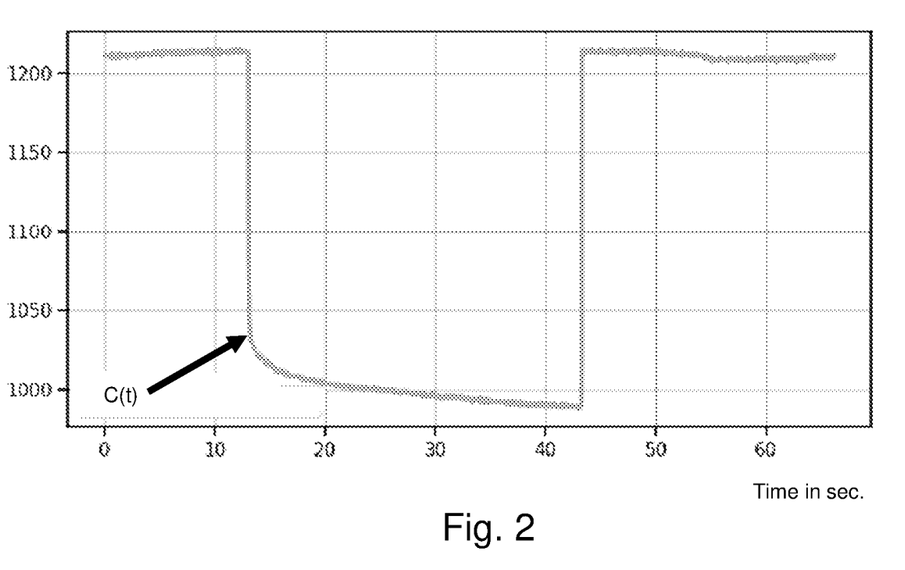
FIG. 2 shows a capacitance-time diagram showing the time course of a measured electrical capacitance C(t) of a capacitive force sensor when an external force is applied according to FIG. 1.

FIG. 2 shows a capacitance-time diagram to illustrate the time course of a measured electrical capacitance C(t), in particular, the intrinsic capacitance of a capacitive force sensor (such as the resistive and capacitive force sensor proposed here) when an external force is applied as shown in FIG. 1. Shown along the x-axis is the time t in seconds and along the y-axis is a unit in counts indicating the capacitance C(t).

It can be clearly seen that the measured capacitance C(t) of the capacitive force sensor initially decreases quasi-spontaneously from approximately 1220 units to approximately 1030 units at the start of the mechanical force application from second 13, but then continues to drop continuously to approximately 990 units until second 43, although the externally applied force remains unchanged during this period.

Such a measured value drift is basically also found with resistive force sensors.

Figure 3:
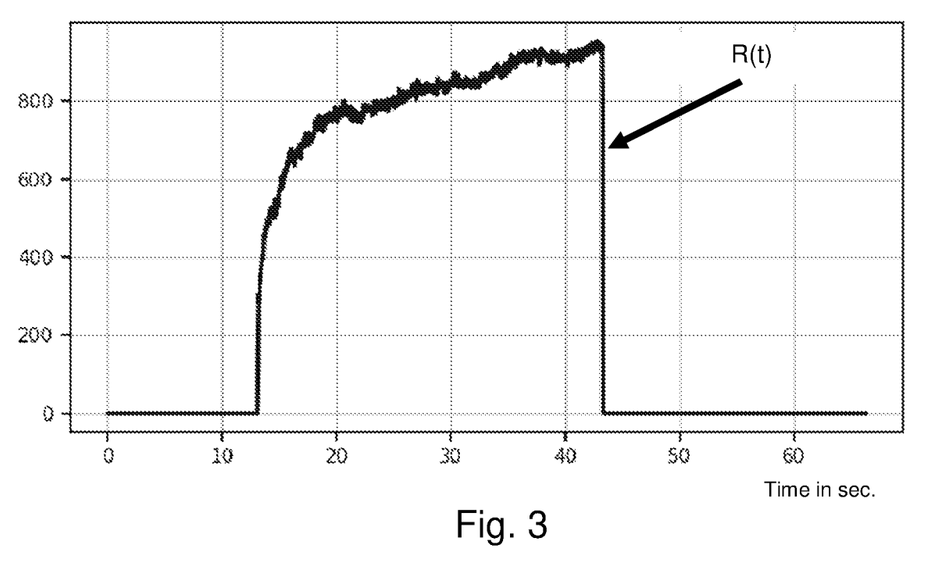
FIG. 3 shows a resistance-time diagram showing the time course of a measured electrical resistance R(t) of a resistive force sensor when an external force is applied according to FIG. 1.

FIG. 3 shows a resistance-time diagram to illustrate the time course of a measured electrical resistance R(t) of a resistive force sensor (such as the resistive and capacitive force sensor proposed here) when an external force is applied as shown in FIG. 1. The time t in seconds is shown along the x-axis and a unit in counts indicating the electrical resistance R(t), e.g., between two electrodes, is shown along the y-axis.

It can be clearly seen that the measured resistance R(t) of the resistive force sensor initially rises quasi-spontaneously from 0 units to approximately 300 units at the start of the mechanical force application from second 13, but then continues to rise continuously to approximately 900 units until second 43, although the externally applied force remains unchanged during this period.

FIGS. 2 and 3 thus show a drift behavior of the determined measured values typical for capacitive and resistive force sensors when a constant mechanical force is applied.

Figure 4:
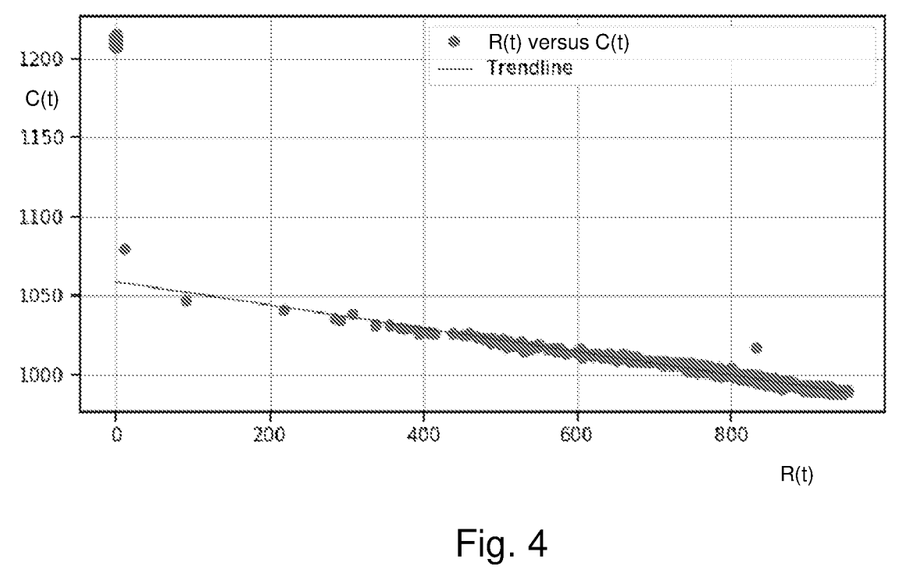
FIG. 4 shows an R(t) versus C(t) diagram based on the measured values of FIG. 2 and FIG. 3.

FIG. 4 shows an R(t) versus C(t) diagram based on the measured values of FIG. 2 and FIG. 3 and thus a correlation of the respective drift behavior for R(t) and C(t). It is clearly visible that the drift behavior of R(t) versus C(t) can be well approximated linearly.

Figure 5:
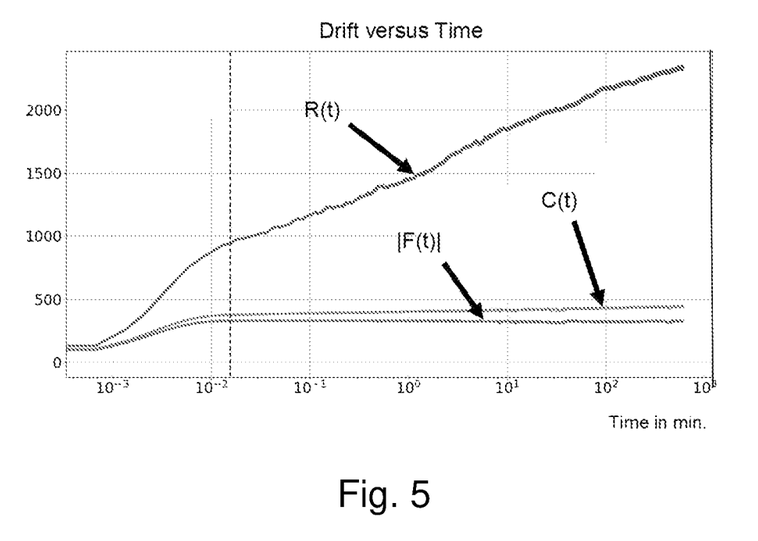
FIG. 5 shows drift for R(t), C(t), and |F(t)| for application of a constant force $F_0$ of a magnitude $|F_0|$ on a sensor element of the resistive and capacitive force sensor according to the invention over a period of time.

FIG. 5 shows a drift for R(t), C(t) and |F(t)| for application of a constant force $F_0$ of a magnitude $|F_0|$=5 N from a time shortly before $10^{-3}$ min to a time shortly before $10^3$ min on the sensor element 100 of a resistive and capacitive force sensor according to the invention over a time period of approximately 10 h. Shown along the x-axis is the time t in minutes and along the y-axis a normalized unit for R(t), C(t) and |F(t)|.

The curves for R(t) and C(t) show the time course of the corresponding measured values and thus the respective measured value drift. The curve |F(t)| shows the force magnitude |F(t)| of the force F(t) determined from the measured values for R(t) and C(t) according to equation (2). It can be clearly seen that the measured values of the force magnitude |F(t)| for the force F(t) determined with the sensor according to the invention have only a very small drift and thus the force sensor according to the invention provides considerably more stable and more accurate measured values than previously known generic force sensors. For example, the measured value drift can be reduced by 99% compared with the original resistive signal R(t).

Figure 6A:
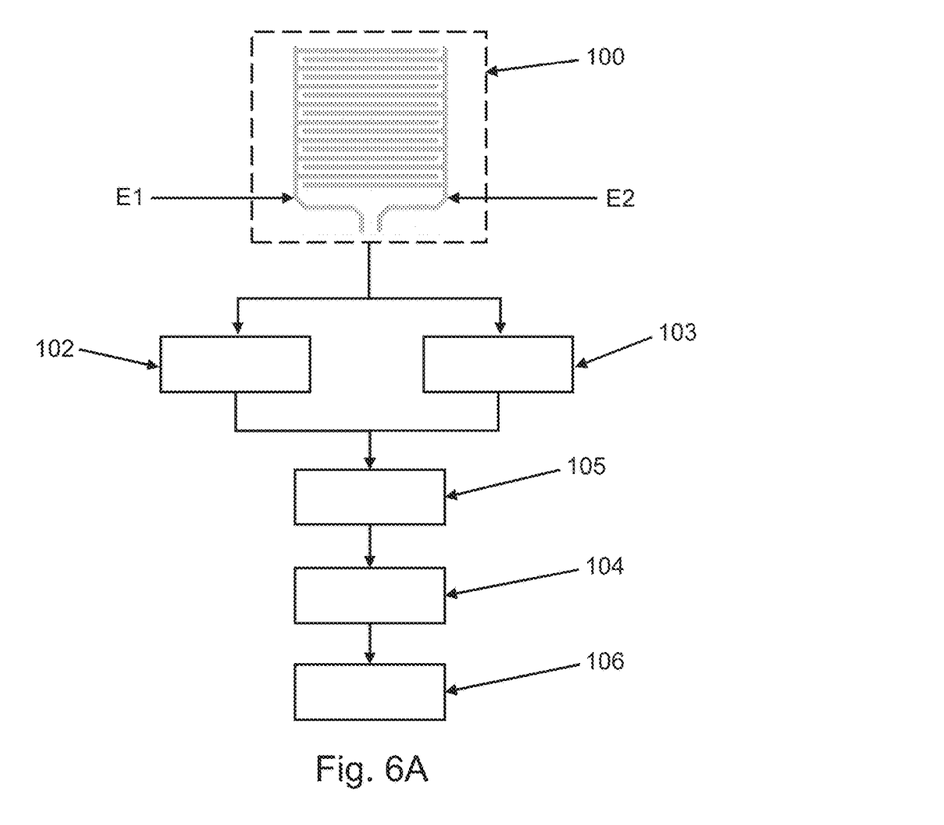
FIG. 6A shows strongly schematized illustration of an embodiment of the proposed resistive and capacitive force sensor, including a sensor element of the resistive and capacitive force sensor.

FIG. 6A shows a highly schematized representation of an embodiment of the proposed resistive and capacitive force sensor including at least one sensor element 100 with at least a first electrode E1 and a second electrode E2, wherein the sensor element 100 is designed in such a way that, when an external force F is applied, an intrinsic electrical capacitance C of the electrodes E1 and/or E2 and an electrical resistance R between the first electrode E1 and a second electrode E2 change as a function of a magnitude |F| of the force F, a first measuring unit 102, which is electrically connected to the first electrode E1 and the second electrode E2 and is designed and set up to determine an intrinsic electrical capacitance C(t) of the electrode E2, and a second measuring unit 103, which is electrically connected to the first electrode E1 and the second electrode E2, and which is designed and configured to determine an electrical resistance R(t) between the first electrode E1 and a second electrode E2, an evaluation unit 104, which is designed and configured to determine a force magnitude |F(t)| of a force F(t) applied externally to the sensor element 100 as a function of a mean value mean(C[t−Δt, t]) of the determined time-dependent intrinsic capacitance C(t) in a time interval [t−Δt, t] and as a function of a mean value mean(R[t−Δt, t]) of the determined time-dependent resistance R(t) in the time interval [t−Δt, t]:|F(t)|=|F(mean(C[t−Δt, t]), mean(R[t−Δt, t]))|, with Δt: time period and t: time, and an output unit 106 for outputting and/or displaying the determined force magnitude |F(t)| of the force F(t).

Figure 6B:
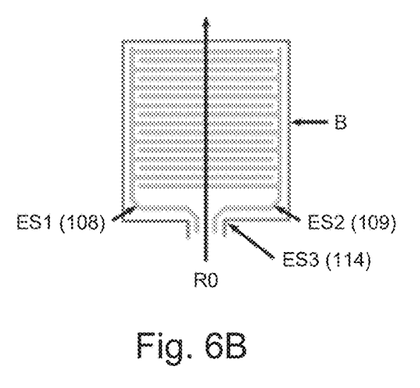
FIGS. 6B and 6C show an example embodiment of the sensor element of the resistive and capacitive force sensor in FIG. 6A.
Figure 6C:
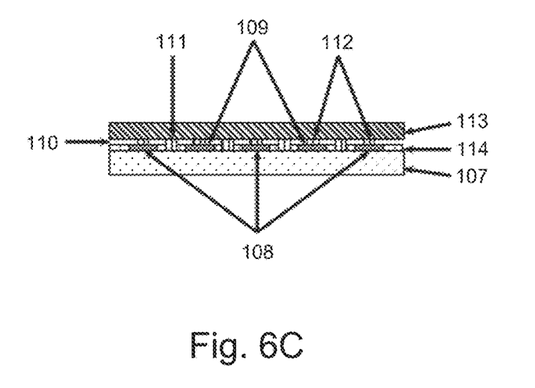

FIGS. 6B and 6B show an example of the sensor element 100 in FIG. 6A. As shown in FIG. 6C, the sensor element 100 includes: a substrate layer 107 made of an electrically non-conductive material M1, a first electrode layer ES1 (108) applied to an upper side of the substrate layer 107 as the first electrode E1, and a second electrode ES2 (109) applied to the upper side of the substrate layer 107 as an electrode E2, wherein the first and second electrode layers 108, 109 made of an electrically conductive material M2, are arranged on the upper side laterally spaced apart from one another and each have a 2D shape which is designed in such a way that partial regions of the first electrode layer 108 and partial regions of the second electrode layer 109 alternate successively several times at least in a region B on the top side along a direction R0 (as shown in FIG. 6B), a spacer layer 110 of an essentially electrically non-conductive material M3 including first spacers 111 applied to the substrate layer 107 in interstices between the first and second electrode layers 108 and 109 and projecting beyond the latter in a resting state, and/or including second spacers 112 applied individually in each case to the electrode layers 108 and 109, and measuring layer 113 of an electrically conductive, elastic, and stretchable material M4 applied to the first and second spacers 111, 112 of the spacer layer 110. As a further in FIG. 6C, there is provided a third electrode E3 for capacitive distance measurement between an object and the sensor element 100. The third electrode E3 can at least partially enclose electrodes 108 and 109. The evaluation unit 104 is designed and set up to perform the determination of the first calibration constant $C_{OFFSET}$ only if the capacitance of the third E3 is smaller than a predetermined limit value, wherein the limit value represents a capacitance and thus a distance at which the object has no mechanical contact with the sensor element 100. This ensures that the determination of the first calibration constant $C_{OFFSET}$ is only performed when an object does not approach the sensor element 100 closer than the capacitance limit value and thus no external force acts on the sensor element 100.

Figure 7:
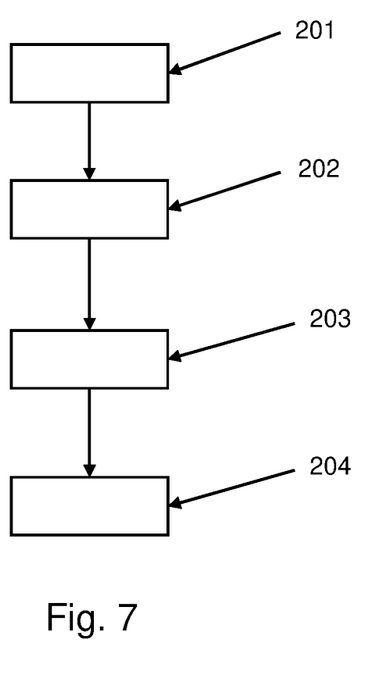
FIG. 7 shows highly schematized illustration of an example embodiment of a method of operating a proposed resistive and capacitive force sensor.

FIG. 7 shows a highly schematized representation of an example embodiment of a method of operating a proposed resistive and capacitive force sensor which has at least one sensor element 100 with at least a first electrode E1 and a second electrode E2, wherein the sensor element 100 is designed in such a way that, when an external force F is applied, the intrinsic electrical capacitance C of the electrodes E1 and/or E2 and the electrical resistance R between the first electrode E1 and the second electrode E2 change as a function of the force magnitude |F| of the force F. The method includes the following steps.

In a step 201, a first measuring unit 102, which is electrically connected to the first electrode E1 and the second electrode E2, is used to determine the intrinsic electrical capacitance C(t) of the electrode E2. In a step 202, a second measuring unit 103, which is electrically connected to the first electrode E1 and the second electrode E2, is used to determine the electrical resistance R(t) between the first electrode E1 and the second electrode E2. In a step 203, an evaluation unit 104 is used to determine the force magnitude |F(t)| of the force F(t) applied externally to the sensor element (100) as a function of a mean value mean(C[t−Δt, t]) of the determined time-dependent intrinsic capacitance C(t) in a time interval [t−Δt, t] and dependent on a mean value mean(R[t−Δt, t]) of the determined time-dependent resistance R(t) in the time interval [t−Δt, t]: |F(t)|=|F(mean (C[t−Δt, t]), mean(R[t−Δt, t]), $C_{OFFSET}$)|, with Δt: time period and t: time. In a step 204, the determined force magnitude |F(t)| of force F(t) is output and/or displayed.

Although the invention has been further illustrated and explained in detail by example embodiments, the invention is not limited by the disclosed examples and other variations may be derived therefrom by a person skilled in the art without departing from the scope of protection of the invention. It is therefore clear that a wide range of variations exists. It is also clear that example embodiments are really only examples which are not to be understood in any way as limiting, for example, the scope of protection, the possibilities of use or the configuration of the invention. Rather, the preceding specification and the figure description enable the person skilled in the art to implement the example embodiments in a concrete manner, wherein the person skilled in the art, being aware of the disclosed inventive idea, can make a variety of changes for example with respect to the function or the arrangement of individual elements mentioned in an example embodiment, without leaving the scope of protection defined by the claims and their legal equivalents, such as further explanations in the specification.

LIST OF REFERENCE NUMBERS

100 Sensor element
102 First measuring unit
103 Second measuring unit
104 Evaluation unit
105 Calibration unit
106 Output unit
107 Substrate
108 Electrode ES1
109 Electrode ES2
110 Space layer
111, 112 First and second spacers of the spacer layer
113 Measurement layer
114 Electrode ES3
201-204 Method steps

The invention claimed is:

1. A resistive and capacitive force sensor, the force sensor comprising:
    at least one sensor element having at least a first electrode E1 and a second electrode E2, wherein the sensor element is designed in such a way that, when an external force F is applied, an inherent electrical capacitance C of the first electrode E1 and/or the second electrode E2 and an electrical resistance R between the first electrode E1 and the second electrode E2 change as a function of a magnitude |F| of the force F;
    a first measuring unit electrically connected to the first electrode E1 and the second electrode E2, the first measuring unit designed and arranged to determine a time-dependent intrinsic electrical capacitance C(t) of the electrode E2;
    a second measuring unit electrically connected to the first electrode E1 and the second electrode E2, the second measuring unit designed and arranged for to determine a time-dependent electrical resistance R(t) between the first electrode E1 and the second electrode E2;
    an evaluation unit designed and arranged to determine a magnitude |F(t)| of a force F(t) applied externally to the sensor element (100) as a function of a mean value mean (C [t−Δt, t]) of the determined time-dependent intrinsic electrical capacitance C(t) in a time interval [t−Δt, t] and as a function of a mean value mean (R [t−Δt, t]) of the determined time-dependent electrical resistance R(t) in the time interval [t−Δt, t]:
        (1) |F(t)|=|F (mean (C [t−Δt, t]), mean (R [t−Δt, t])) |,
            with Δt: time period and t: time; and
    an output unit to output and/or display the determined magnitude |F(t)| of the force F(t).

2. A resistive and capacitive force sensor according to claim 1, wherein the evaluation unit determines the magnitude |F(t)| of the force F(t) as follows:

(2) $|F(t)|=C_{OFFSET}-(\text{mean}(C[t-\Delta t, t])-m\cdot\text{mean}(R[t-\Delta t, t]))$ with:

$C_{OFFSET}$: first calibration constant, mean($C[t-\Delta t, t]$); mean value of the time-dependent intrinsic capacitance $C(t)$ in the time interval $[t-\Delta t, t]$, mean($R[t-\Delta t, t]$); mean value of the time-dependent resistance $R(t)$ in the time interval $[t-\Delta t, t]$, and m: second calibration constant.

3. The resistive and capacitive force sensor according to claim 2, wherein the $C_{OFFSET}$ and/or m each are determined automatically when the resistive and capacitive force sensor is started up.

4. The resistive and capacitive force sensor according to claim 1, wherein the sensor element comprises:
   a substrate layer of an electrically non-conductive material M1,
   a first electrode layer ES1 applied to an upper side of the substrate layer as the first electrode E1 and a second electrode layer ES2 applied to the upper side of the substrate layer as the second electrode E2, wherein the first electrode layer ES1 and the second electrode ES2 consist of an electrically conductive material M2, are arranged laterally spaced apart from one another on the upper side and each have a 2D shape which is designed in such a way that partial regions of the first electrode layer ES1 and partial regions of the second electrode layer ES2 alternate successively a number of times along a direction R0 at least in a region B on the upper side,
   a spacer layer of a substantially electrically non-conductive material M3 including first spacers applied to the substrate layer in spaces between the first electrode layer ES1 and the second electrode layer ES2 and projecting beyond them in a resting state and/or including second spacers each applied singly to the first electrode layer ES1 and the second electrode layer ES2, and
   a measuring layer of an electrically conductive, elastic, and stretchable material M4 applied to the spacer layer.

5. The resistive and capacitive force sensor according to claim 1, wherein the force sensor comprises a calibration unit designed and arranged to determine a first calibration constant $C_{OFFSET}$ by detecting the time-dependent intrinsic capacitance $C(t)$ of the second electrode E2 without external force application to the sensor element over a first calibration period $\Delta t_{CAL1}$ and subsequently averaging of the time-dependent intrinsic capacitance $C(t)$ detected in $\Delta t_{CAL1}$.

6. The resistive and capacitive force sensor according to claim 5, wherein the calibration unit is designed and arranged to determine a second calibration constant m by calibration, wherein for a second calibration period $\Delta t_{CAL2}$ a constant force $|F_0|>0$ is applied to the sensor element for a second calibration period $\Delta t_{CAL2}$, the time-dependent intrinsic electrical capacitance $C(t)$ of the second electrode E2 and the time-dependent electrical resistance $R(t)$ between the first electrode E1 and a second electrode E2 are recorded, and the second calibration constant m is then determined from recorded values for $C(t)$ and $R(t)$ via a linear regression.

7. The resistive and capacitive force sensor according to claim 6, wherein the calibration unit comprises a mechanical device to apply the constant force $|F_0|>0$ to the sensor element.

8. The resistive and capacitive force sensor according to claim 5, wherein the calibration unit is designed and arranged to determine the first calibration constant $C_{OFFSET}$ only if the time-dependent electrical resistance $R(t)$ between the first electrode E1 and the second electrode E2 is constant, substantially infinite, throughout the first calibration period $\Delta t_{CAL1}$.

9. The resistive and capacitive force sensor according to claim 1, wherein the sensor element comprises a third electrode E3 designed and arranged to measure capacitive distance between an object and the sensor element, and wherein the evaluation unit is designed and set up to determine a first calibration constant $C_{OFFSET}$ only if capacitance of the third electrode E3 is smaller than a predetermined limit value, wherein the limit value represents a capacitance at which the object has no mechanical contact with the sensor element.

10. A method of operating a resistive and capacitive force sensor, wherein the force sensor includes at least one sensor element having at least a first electrode E1 and a second electrode E2, wherein the sensor element is designed in such a way that, when an external force F is applied, an inherent electrical capacitance C of the first electrode E1 and/or the second electrode E2 and an electrical resistance R between the first electrode E1 and the second electrode E2 change as a function of a magnitude $|F|$ of the force F, wherein the method comprises:
   determining a time-dependent intrinsic electrical capacitance $C(t)$ of the second electrode E2 with a first measuring unit electrically connected to the first electrode E1 and the second electrode E2;
   determining a time-dependent electrical resistance $R(t)$ between the first electrode E1 and the second electrode E2 with a second measuring unit electrically connected to the first electrode E1 and the second electrode E2;
   determining with an evaluation unit a magnitude $|F(t)|$ of a force $F(t)$ applied externally to the sensor element as a function of the mean value mean ($C[t-\Delta t, t]$) of the determined time-dependent intrinsic capacitance $C(t)$ in the time interval $[t-\Delta t, t]$ and as a function of the mean value mean ($R[t-\Delta t, t]$) of the determined time-dependent resistance $R(t)$ in the time interval $[t-\Delta t, t]$:
   (1) $|F(t)|=|F(\text{mean}(C[t-\Delta t, t]), \text{mean}(R[t-\Delta t, t]))|$,
   with $\Delta t$: time period and t: time; and
   outputting and/or displaying via an output unit the determined magnitude $|F(t)|$ of the force $F(t)$.

11. The method according to claim 10, wherein determining the magnitude $|F(t)|$ of the force $F(t)$ is determined as follows:
   (2) $|F(t)|=C_{OFFSET}-(\text{mean}(C[t-\Delta t, t])-m\cdot\text{mean}(R[t-\Delta t, t]))$
   with:
   $C_{OFFSET}$: first calibration constant,
   mean ($C[t-\Delta t, t]$): mean value of the time-dependent intrinsic capacitance $C(t)$ in the time interval $[t-\Delta t, t]$,
   mean($R[t-\Delta t, t]$): mean value of the time-dependent resistance $R(t)$ in the time interval $[t-\Delta t, t]$, and
   m: second calibration constant.

12. The method according to claim 10, wherein the sensor element comprises:
   a substrate layer of an electrically non-conductive material M1,
   a first electrode layer ES1 applied to an upper side of the substrate layer as the first electrode E1 and a second electrode layer ES2 applied to the upper side of the substrate layer as the second electrode E2, wherein the first electrode layer ES1 and the second electrode ES2 consist of an electrically conductive material M2, are arranged laterally spaced apart from one another on the upper side and each have a 2D shape which is designed in such a way that partial regions of the first electrode layer ES1 and partial regions of the second electrode layer ES2 alternate successively a number of times along a direction R0 at least in a region B on the upper side, a spacer layer of a substantially electrically non-conductive material M3 including first spacers applied to the substrate layer in spaces between the first electrode layer ES1 and the second electrode layer ES2 and projecting beyond them in a resting state and/or including second spacers each applied singly to the first electrode layer ES1 and the second electrode layer ES2, and a measuring layer of an electrically conductive, elastic, and stretchable material M4 applied to the spacer layer.

13. The method according to claim 10, wherein the method comprises determining via a calibration unit a first calibration constant $C_{OFFSET}$ by detecting the time-dependent intrinsic capacitance C(t) of the second electrode E2 without external force application to the sensor element over a first calibration period $\Delta t_{CAL1}$ and subsequently averaging of the time-dependent intrinsic capacitance C(t) detected in $\Delta t_{CAL1}$.

14. The method according to claim 13, wherein the method comprises determining via the calibration unit a second calibration constant m by calibration, wherein the determining comprises applying a constant force $|F_0|>0$ to the sensor element for a second calibration period $\Delta t_{CAL2}$; recording the time-dependent intrinsic electrical capacitance C(t) of the second electrode E2 and the time-dependent electrical resistance R(t) between the first electrode E1 and a second electrode E2; and determining the second calibration constant m from recorded values for C(t) and R(t) via a linear regression.

15. The method according to claim 14, wherein the method comprises applying via a mechanical device of the calibration unit the constant force $|F_0|>0$ to the sensor element.

16. The method according to claim 13, wherein the method comprises determining via the calibration unit the first calibration constant $C_{OFFSET}$ only if the time-dependent electrical resistance R(t) between the first electrode E1 and the second electrode E2 is constant, substantially infinite, throughout the first calibration period $\Delta t_{CAL1}$.

17. The method according to claim 10, wherein the method comprises measuring via a third electrode E3 of the sensor element capacitive distance between an object and the sensor element, and determining via the evaluation unit a first calibration constant $C_{OFFSET}$ only if capacitance of the third electrode E3 is smaller than a predetermined limit value, wherein the limit value represents a capacitance at which the object has no mechanical contact with the sensor element.

18. The method according to claim 10, wherein the method comprises automatically determining $C_{OFFSET}$ and/or m when the resistive and capacitive force sensor is started up.

* * * * *